United States Patent [19]
Gold et al.

[11] Patent Number: 5,505,825
[45] Date of Patent: Apr. 9, 1996

[54] ELECTRICALLY CONDUCTIVE SORPTION SYSTEM AND METHOD

[75] Inventors: Harris Gold, Lexington; Richard E. Hicks, Waban; Andrew C. Harvey, Waltham; John F. McCoy, III, Chelmsford, all of Mass.

[73] Assignee: Foster Miller Inc., Waltham, Mass.

[21] Appl. No.: 309,076

[22] Filed: Sep. 20, 1994

[51] Int. Cl.⁶ .................................................. B01D 29/62
[52] U.S. Cl. .............................. 95/126; 95/143; 95/148; 96/112; 96/143; 96/153
[58] Field of Search .................................. 204/130, 180.1, 204/299 R; 95/73, 81; 96/143, 112

[56] References Cited

U.S. PATENT DOCUMENTS

| | | | |
|---|---|---|---|
| 3,634,028 | 1/1972 | Hohne | 23/25 |
| 4,421,651 | 12/1983 | Burkholder et al. | 210/672 |
| 4,717,697 | 1/1988 | Kunugiza et al. | 502/34 |
| 5,069,038 | 12/1991 | Prinze | 62/18 |
| 5,187,131 | 2/1993 | Tiggelbeck et al. | 502/34 |
| 5,423,904 | 6/1995 | Dasgupta | 96/146 |

FOREIGN PATENT DOCUMENTS

| | | |
|---|---|---|
| 104749 | 4/1984 | European Pat. Off. |
| 50-152994 | 12/1975 | Japan |
| 207547 | 11/1923 | United Kingdom |
| 285480 | 2/1928 | United Kingdom |

*Primary Examiner*—John Niebling
*Assistant Examiner*—Arun S. Phasge
*Attorney, Agent, or Firm*—Iandiorio & Teska

[57] ABSTRACT

An electrically conductive sorption and in situ regeneration system and method for separating species of different adsorption characteristics in a fluid includes flowing a contaminated fluid through an electrically conductive sorbent bed having a multiplicity of adsorption sites, and providing an electric current through the sorbent bed to heat the bed to increase the adsorption sites available for adsorption by the bed of the more strongly adsorbed specie by inhibiting adsorption by the bed of the less strongly adsorbed specie which might occupy adsorption sites in the bed.

20 Claims, 3 Drawing Sheets

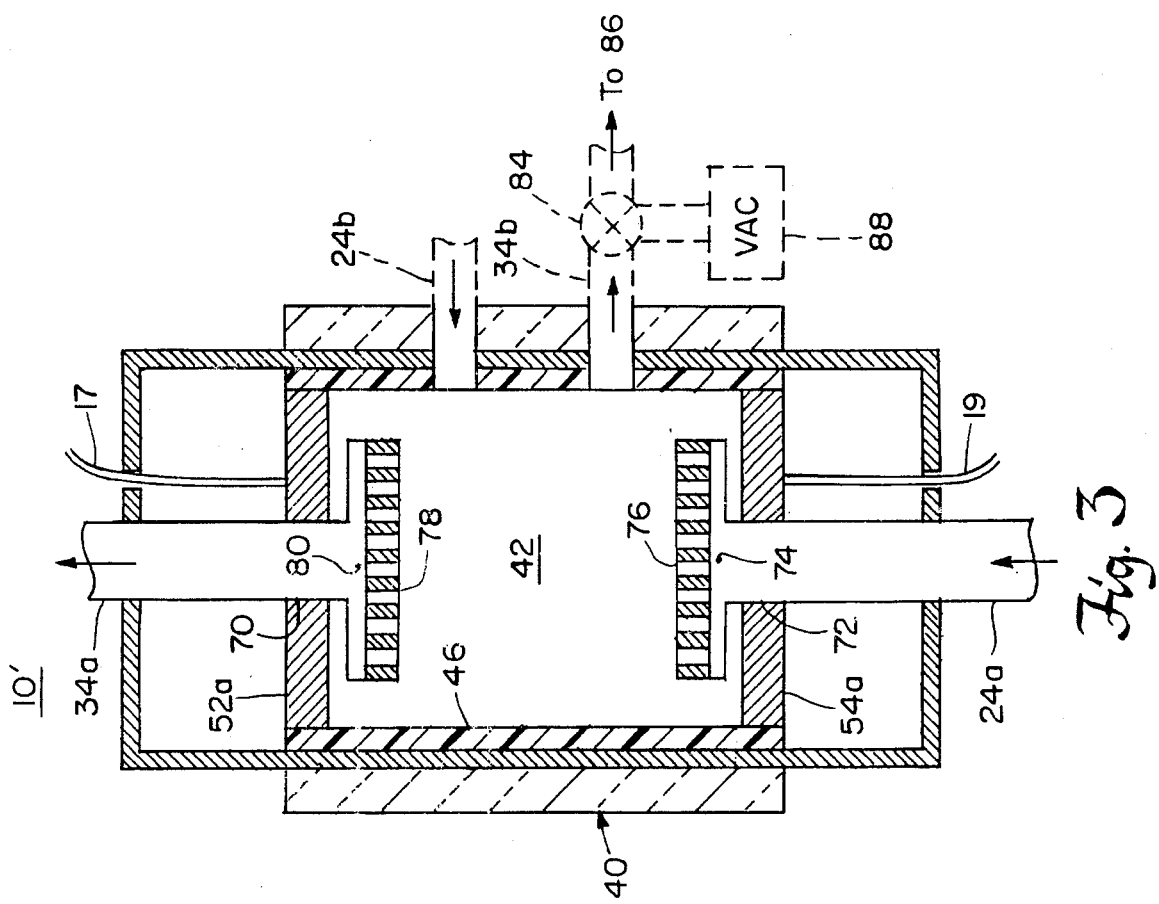
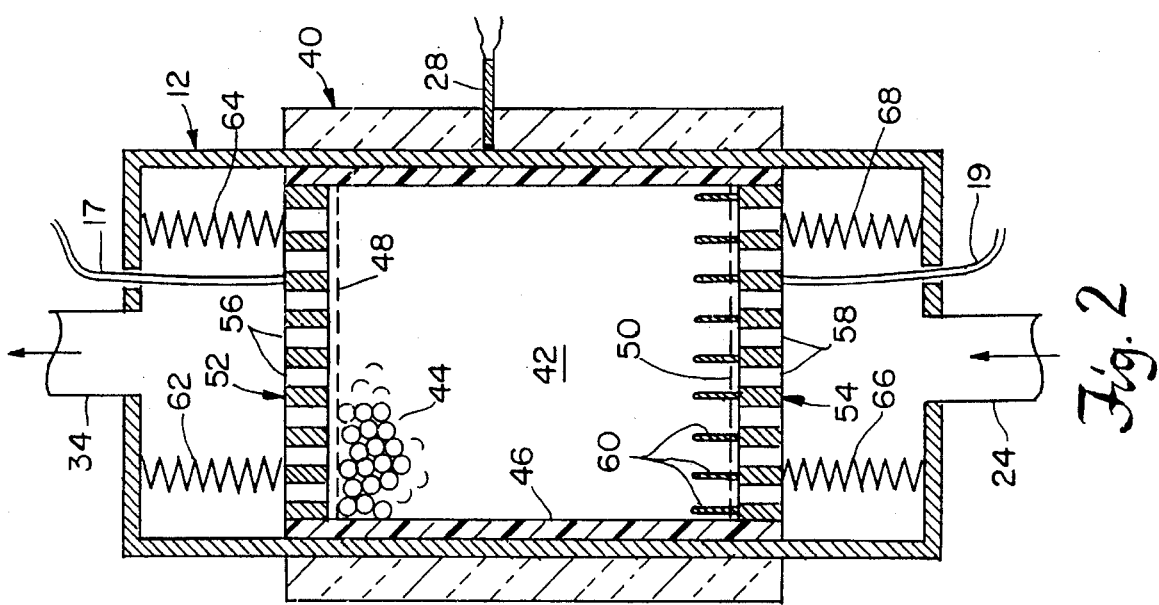
Fig. 3
Fig. 2

ELECTRICALLY CONDUCTIVE SORPTION SYSTEM AND METHOD

FIELD OF INVENTION

This invention relates to an improved electrically conductive sorption system and method that can achieve both adsorption and regeneration in situ for separating species of different adsorption characteristics, and more particularly to such a system which can separate species of different adsorption characteristics.

BACKGROUND OF INVENTION

One type of conventional water purifier employs air to strip volatile (low boiling point) organic contaminants from water. Historically, air discharged from the purification was simply discharged to the atmosphere. Because this air is contaminated, this is no longer acceptable in many applications. The air also must be cleansed and the contaminants properly disposed of. An accepted and practical solution is to flow the contaminated stripper air through or across an adsorbent bed such as activated carbon, hereinafter referred to as carbon, that will properly capture the contaminants. However, since the air is stripping contaminants from water the air is also laden with moisture. This limits the effectiveness of the carbon because the moisture occupies many of the adsorption sites on the carbon which ideally would be occupied by the contaminant specie, e.g., trichloroethylene (TCE). In order to improve the efficiency of such systems the air may be preheated before entering the bed to reduce the relative humidity, but this requires a special heater and added energy to heat the large mass of air flowing through the bed.

After a time, the bed is loaded with the volatile organic contaminant (VOC) and moisture and becomes inefficient; the bed must then be regenerated, by heating, for example to 100° C., to drive off both the volatile contaminant and the moisture. When the carbon bed is used to clean liquids contaminated with heavier, more complex organic molecules, the bed must be heated to even higher temperatures, e.g., 800° C., for regeneration. At these elevated regeneration temperatures (800° C.), a special furnace is required, and the regeneration is not normally done in situ: the entire bed is transported to the high temperature furnace for regeneration and then returned and reinstalled to resume operation, a costly and time consuming procedure.

The principal operating cost of the activated carbon process is the cost of regeneration. Steam is the most common means of regenerating carbon. Water is first heated to steam in a boiler and the steam is then passed over or through the carbon. As the steam heats the carbon to its regeneration temperature, the VOCs are released and flushed away by the steam. The VOCs are recovered either in a mixture of water via condensation or separately via condensation and VOC/water separation (decantation or distillation). The process of heating the carbon with steam is inefficient because the heat is transferred indirectly first to the water to make steam and then to the carbon via the heat capacity of the steam. Steam systems also require expensive distillation equipment needed to separate the VOCs from the water, which further increases the energy requirements.

Another method of regenerating the activated carbon recently has been introduced and involves the use of a dry, inert gas, such as nitrogen, for solvent recovery applications. The inert gas is first heated above the regeneration temperature of the carbon and then passed over the carbon bed. As the carbon bed heats up, the VOCs desorb from the carbon and are purged from the carbon bed in a manner similar to steam. The major advantage of this method is that because the inert gas is dry, the VOCs can be recovered directly by cooling and condensation without any water/VOC separation. The operating costs of this system can be lower for the removal and separation of water soluble solvents where other evaporation steps are required, e.g., distillation. However, because the heat capacity of the inert gas is lower than for steam, more gas is required to heat the carbon, from a point of view of both volumetric flow rate and flow time. As a result, the capital cost of the VOC recovery system for inert gas is much higher than for steam.

With respect to adsorption, although the problems have been explained in terms of water being the specie that it is desired to inhibit from occupying adsorption sites on a carbon bed so that TCE can be more effectively collected, the problem is broader than that. It can occur between any two or more species using a suitable material for the decontaminating sorbent bed.

One prior art system, disclosed in the Tigglebeck et al. patent, U.S. Pat. No. 5,187,131, teaches in situ regeneration; however, this system utilizes a technique similar to the prior art inert gas technique described above. Using an inert gas to purge the carbon bed is energy inefficient and increases operating costs.

Another prior art system, disclosed in the Rintoul European Patent Application No. 83306795.4, teaches remote as opposed to in situ regeneration of activated carbon. This system also requires the use of an inert gas or steam to purge the contaminants from the carbon.

SUMMARY OF INVENTION

It is therefore an object of this invention to provide an improved system and method of in situ regeneration of carbon and other conducting sorption media.

It is a further object of this invention to provide an improved sorption system and method.

It is a further object of this invention to provide such an improved sorption system and method which inhibits the collection of the more innocuous species which compete for adsorption sites on the carbon.

It is a further object of this invention to provide such an improved sorption system and method which uses essentially the same equipment to regenerate.

It is a further object of this invention to provide such an improved in situ regeneration and sorption system and method which is more economical and simpler.

The invention results from the realization that activated carbon and other conducting material can be efficiently heated using electrical resistance heating. Furthermore, improved sorption can be effected by electrically heating the adsorption bed (to a few degrees above room temperature) instead of the incoming moist, contaminated air to inhibit collection by the bed of the more strongly adsorbed specie (at room temperature, e.g., water) and to apply the heating energy intermittently to minimize heating of the effluent, e.g., air; and using the same heating agent to raise the bed to a more elevated temperature to regenerate the bed in situ.

This invention features an electrically conductive sorption system for separating species of different adsorption characteristics in the fluid, including a containment vessel and an electrically conductive permeable sorbent bed in the vessel having a multiplicity of adsorption sites. There is a porting structure for supplying contaminated fluid at one surface of the bed and receiving the decontaminated fluid at another surface of the bed. A pair of spaced electrodes supplies current through the bed during the adsorption to heat the bed to inhibit adsorption by the bed of the more strongly adsorbed species which occupies adsorption sites in the bed, thereby increasing the adsorption sites available for adsorption by the bed of the less strongly adsorbed species.

In a preferred embodiment the vessel may be generally cylindrical and it may be thermally insulated. The sorbent bed may be granular, pelletized, and it may be made of carbon. The insulating medium may be a liner between the vessel and sorbent bed made of a ceramic or tetrafluoroethylene. The porting structure may include one or more perforations in the electrodes, or it may include a laterally oriented inlet and outlet to the bed between the electrodes. The surfaces may be the opposite ends of the bed. The less strongly adsorbed specie may be water. The contaminated vessel may be conducting and there may be an electrically insulating medium for electrically isolating the bed from the vessel. The bed may be heated to approximately 20° C. above fluid inlet temperature. There may be a controller for intermittently applying current to the electrodes to periodically raise the temperature of the bed to drive off the more strongly adsorbed specie and release more collection sites for adsorption of the less strongly adsorbed specie. The electrodes may be carbon and they may include salient portions extending into the sorbent bed for increased electrical contact. There may be a bias structure for resiliently urging the electrodes into constant contact with the bed.

The invention also features an in situ electrically conductive sorption regeneration system for removing one or more adsorbed species in a fluid from a sorbent bed, including a containment vessel, an electrically conductive permeable sorbent bed in the vessel having a multiplicity of adsorption sites, an electrically insulating medium for electrically isolating the bed from the vessel, a porting structure for removing the desorbed species, and a pair of spaced electrodes contacting the bed for applying current through the bed to heat the bed to at least one elevated temperature to desorb at least one adsorbed specie and regenerate the bed. In a preferred embodiment the porting structure may include an inlet and an outlet for passing purge fluid to and from the bed to purge one or more adsorbed species. The porting structure may include an outlet for egress of one or more adsorbed species and may include an outlet for applying a vacuum to remove one or more adsorbed species.

The invention also features an in situ electrically conductive sorption system for separating species of different adsorption characteristics including water in a fluid. There is a containment vessel and an electrically conductive permeable sorbent bed in the vessel having a multiplicity of adsorption sites. An electrically insulating medium electrically isolates the bed from the vessel and a porting structure supplies contaminated fluids at one surface of the bed and receives the decontaminated fluid at another surface of the bed. A pair of spaced electrodes apply a current through the bed during adsorption. A controller for intermittently applying current to the electrodes to periodically heat the bed to inhibit adsorption by the bed of the water which occupies adsorption sites in the bed, thereby increasing the adsorption sites for adsorption by the bed of the more strongly adsorbed species.

This invention also features an in situ electrically conductive sorption system for inhibiting water adsorption from at least one other specie of different adsorption characteristics including a containment vessel, an electrically conductive permeable sorbent carbon bed in the vessel having a multiplicity of adsorption sites, and an electrically insulating medium for electrically isolating the bed from the vessel. There is a porting structure for supplying contaminated fluid at one surface of the carbon bed and for receiving decontaminated fluid at another surface of the carbon bed. A pair of spaced electrodes applies current through the carbon bed during adsorption to heat the carbon bed to inhibit adsorption by the carbon bed of the water which occupies adsorption sites in the carbon bed, thereby increasing the adsorption sites available for adsorption by the carbon bed of the more strongly adsorbed species.

This invention also features an in situ electrically conductive sorption regeneration system for removing one or more adsorbed species including water in a fluid from a sorbent bed. There is a containment vessel, an electrically conductive permeable sorbent carbon bed in the vessel having a multiplicity of adsorption sites, an electrically insulating medium for electrically isolating the bed from the vessel, a porting structure for removing water and one or more adsorbed species, and a pair of spaced electrodes contacting the bed for applying current through the bed to heat the bed to at least one elevated temperature to desorb water adsorbed by the carbon bed.

This invention also features a method of separating species of different adsorptive characteristics including flowing a contaminated fluid through an electrically conductive sorbent bed having a multiplicity of adsorption sites and providing an electrical current through the sorbent bed to heat the bed and inhibit adsorption by the bed of the most strongly adsorbed specie which occupies adsorption sites in the bed to increase the adsorption sites available for adsorption by the bed in the less strongly adsorptive species. In a preferred embodiment the electric current may be supplied intermittently to maintain the heat of the bed and minimize transfer of heat to the effluent. The electrical current may be supplied at an increased magnitude to heat the bed to an elevated temperature for regeneration in situ.

BRIEF DESCRIPTION OF THE DRAWINGS

Other objects, features and advantages will occur to those skilled in the art from the following description of a preferred embodiment and the accompanying drawings, in which:

FIG. 2 is a more detailed sectional view of a cylindrical sorbent bed according to this invention;

FIG. 3 is a view similar to FIG. 2 of an alternative construction of a sorbent bed according to this invention;

Figure 1:
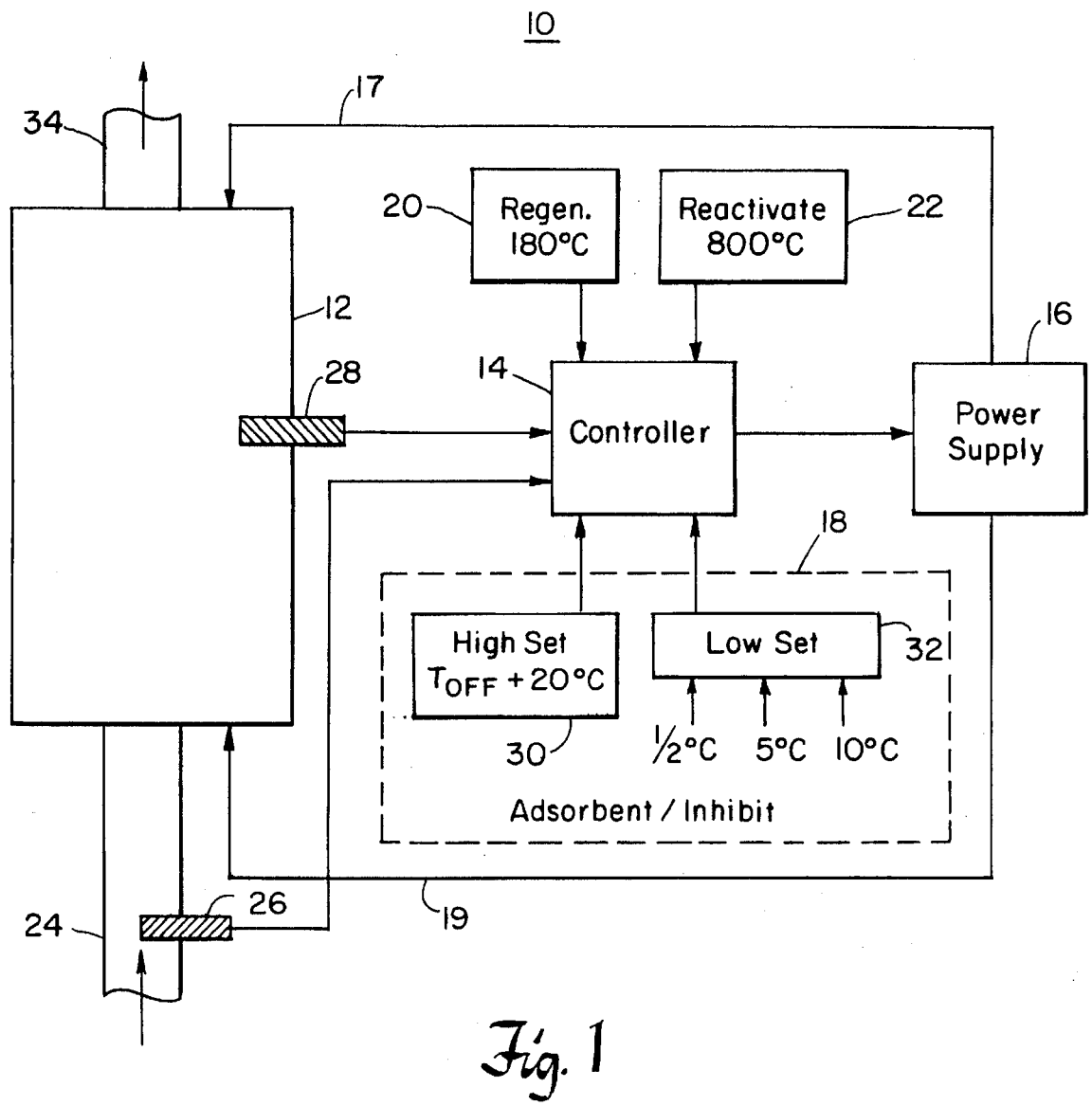
FIG. 1 is a schematic block diagram of an electrically conductive sorbent system for separating species of different adsorption characteristics in a fluid according to this invention.

This invention may be accomplished in an electrically conductive sorption system for separating species of different adsorption characteristics in a fluid. For example, the fluid may be air which contains water vapor and a contaminant such as trichloroethylene (TCE) which has been stripped by the air from contaminated water. The system includes a containment vessel such as a cylindrical metal or plastic tank, and an electrically conductive permeable sorbent bed in the vessel having a multiplicity of adsorption sites. Typically the sorbent bed may be carbon, or more precisely, activated carbon, or it may be activated alumina, depending upon the desired separation and the nature of the species to be separated. If the sorbent is non-conducting, as is silica gel or molecular sieves, conducting material such as copper or silver fibers or spheres can be added to the sorbent bed. Typically when carbon is used it is granular or pelletized. The electrically conductive carbon bed is electrically isolated from the surrounding vessel by an insulating medium which may be a liner, for example, of ceramic or tetrafluoroethylene. Throughout this description the particular materials depend upon their particular ability to resist the attack of the materials which appear in the process and the temperatures which must be withstood. There is a porting structure for supplying contaminated fluid at one surface of the bed and receiving the decontaminated fluid at another surface of the bed. There is a pair of spaced electrodes for applying current through the bed during the adsorption cycle to heat the bed to inhibit adsorption by the bed of the more strongly adsorbed species, for example the water, which would otherwise occupy adsorption sites in the bed; this increases the adsorption sites available for adsorption by the bed of the less strongly adsorbed species. The vessel may be thermally insulated, for example, by surrounding it with fiberglass mat or rigid foam. The electrodes may include one or more perforations so that they form a part of the porting structure. Alternatively, the porting structure may include lateral inlets and outlets to the bed which are positioned between the spaced electrodes. In the former case the ends of the cylindrical bed are the surfaces which receive and emit the contaminated and decontaminated fluid, respectively. In the latter case, where the inlet and outlets are laterally disposed, those surfaces are on the cylindrical wall of the bed. Typically, during the adsorption cycle the bed is periodically heated to approximately 10° to 20° C. above the fluid inlet temperature. A controller intermittently applies current to the electrodes to periodically raise the temperature of the bed to that level to drive off the more strongly adsorbed specie, in this example water, and thereby release more adsorption sites for adsorption by the less strongly adsorbed species, in this example TCE. The controller may be set so that its high setting is at 20° C. above the fluid inlet temperature but its low setting may be a fraction or more ° C. below the high setting. This is done so that the energy supplied is just enough to keep the bed at a temperature whereby the more strongly adsorbed specie, e.g., water, will be driven off from the adsorption sites in order to keep the bed from becoming saturated and to maintain its efficiency, while at the same time ensuring that the bed is not constantly kept at 20° above ambient, for if it were then the system would be also heating the inlet fluid (that is, the air laden with the water and TCE contaminant) to the same temperature. It is one of the aims of this invention to heat only the bed and to minimize the heating of the fluid, for it is realized that it is only the bed that need be heated in order to keep the water or other specie from saturating the bed and that a much larger amount of energy is required to continuously heat the air than is required to periodically heat the bed. The electrodes whether perforated or not, may also be made of carbon or stainless steel, and they may include projecting portions, fingers for example, which extend into the sorbent bed to increase the electrical contact with the bed and reduce arcing. This allows for the fact that the carbon bed will expand and contract with temperature, causing a change in the electrical contact. The projecting fingers are one technique for improving electrical contact under such conditions. Another technique is to use some sort of biasing means such as springs to constantly urge the electrodes at either end toward the bed so that they follow in effect the expanding and shrinking boundary of the carbon bed.

The invention is also accomplished in such a structure in that the electrically conductive sorbent bed may be used not only for the adsorption but also for in situ regeneration of the carbon bed. In such a case, an elevated temperature of 100° C. can be applied with the same apparatus as previously described to regenerate the bed by driving off the adsorbed species, in the specific example referred to, the TCE. The same porting structure may be used for passing a purge fluid such as an inert gas like nitrogen, to purge the one or more adsorbed species during the regeneration cycle. Alternatively, instead of a purge fluid, a vacuum unit may be connected to an outlet port to draw off the desorbed species during regeneration. The removal may also be done by simply opening the porting structure to a collection system and permitting the released adsorbed species to migrate out.

There is shown in FIG. 1 an electrically conductive sorption system 10 according to this invention which includes a vessel 12 including a sorbent bed, a controller 14 for controlling the temperature of the bed, and a power supply 16 which responds to controller 14 to provide over lines 17 and 19 the proper amount of electrical energy to maintain the bed at the desired temperature. In the specific embodiment shown in FIG. 1, system 10 can be operated in three different modes: the adsorption/inhibit mode 18, where the TCE is adsorbed but adsorption of the moisture or water is inhibited; a regeneration mode 20, where the carbon bed can be regenerated in situ; and a reactivation mode 22, where the carbon can be completely reactivated in situ. In this specific example, during the adsorption/inhibit mode 18, the temperature of the air laden with moisture and TCE is introduced at inlet 24, where the inlet temperature is sensed by thermocouple 26 and a signal representative thereof is supplied to controller 14. The temperature of the bed is sensed by thermocouple 28 and a signal representative thereof is also supplied to controller 14. In the adsorption/inhibit mode 18, the high setting 30 for the temperature of the bed may be set at the inlet temperature of thermocouple 26 plus 20° C. The low setting 32 may be set at 0.5° C., or 5° C. or 10° C. below that. The setting depends upon the energy requirements and the efficiency desired. This lower setting 32 is chosen so that the bed is intermittently energized by power supply 16 under control of controller 14 sufficiently to drive off the more adsorptive specie, in this example water, while avoiding maintaining the bed at a fixed temperature which would necessarily heat the air coming in inlet 24 to substantially the same temperature, thereby causing the same inefficiencies as occurred in the prior art, where heaters were used to heat all of the entire contaminated air in order to reduce its relative humidity and hence its adsorption. The decontaminated air is removed through outlet 34.

After a period of time, when the decontamination becomes less efficient, the regeneration mode can be effected by simply operating the controller to engage the power supply steadily to raise the temperature of the bed to 180° C. and drive off the TCE. In this operation an inert gas such as nitrogen can be used to purge the bed while it is held at the 180° C. temperature. The purge may be in the same direction as shown in FIG. 1 as employed in the adsorbent inhibit mode, or the purge gas direction may be reversed so that outlet 34 becomes the inlet and inlet 24 becomes the outlet. If the contaminating species are heavier, less volatile organic molecules, the bed may have to be run through a reactivation mode 22 up to approximately 800° C. in order to break up these heavier molecules and cause them to be removed from the bed as well. However, in accordance with this invention this reactivation, just as the regeneration, can be done in situ using the same apparatus at the same location as used for the adsorbent/inhibit mode 18 operation.

In one embodiment, vessel 12, FIG. 2, may include thermal insulation 40 such as fiberglass mat or a rigid foam surrounding the cylindrical vessel 12. Carbon bed 42 is formed of a plurality of granules or pellets 44 which are insulated from vessel 12 by an insulating medium 46 such as a ceramic or tetrafluoroethylene liner, for example. The carbon bed 42 can be held in place by upper and lower screens 48 and 50. A pair of electrodes 52, 54, which also may be made of carbon, are placed at either end of bed 42. Electrodes 52 and 54 may contain perforations 56 and 58 which together with inlet 24 and outlet 34 comprise a porting structure to allow the contaminated gas to enter one end of carbon bed 42, be decontaminated, and pass out as a clean fluid through the other end of carbon bed 42. In order to improve the contact between the carbon electrodes and bed 42, there may be added fingers 60 as shown with respect to electrode 54, which extend into carbon bed 42 to maintain intimate contact and increase the contact surface between the bed and the electrode. This reduces arcing and also ensures that even when bed 42 expands and contracts with changes in temperature, there will be sufficient electrical contact between electrode 54 and carbon bed 42. Similar fingers may be used with respect to electrode 52. To further ensure that electrodes 52 and 54 maintain good contact with carbon bed 42, biasing means such as springs 62, 64 and springs 66, 68 may provide an inward bias on electrodes 52 and 54, respectively, to constantly urge them toward carbon bed 42.

In an alternative embodiment, FIG. 3, electrodes 52a and 54a may be made solid with the exception of a single hole 70, 72 in each through which the extended outlet 34a and inlet 24a extend. Inlet 24a expands to form a plenum 74 communicating with manifold 76 to distribute the incoming contaminated fluid into bed 42. A similar manifold 78 communicates with a similar plenum 80 formed at the end of inlet 34a to act as a collector for the cleaned effluent. As a further alternative, the inlet and outlet 24a, 34a, respectively, can be designed for a lateral approach as shown at 24b and 34b, which communicate with bed 42 laterally on the cylindrical side wall between electrodes 52a and 54a rather than at or through those electrodes. As shown specifically with respect to outlet 34b, the removal of the purged species during regeneration and/or reactivation can be accomplished through a valve 84 either by opening the valve to further collection system 86, or to a vacuum unit 88 which will draw out the contaminant species without the need for a special purge fluid.

Figure 4:
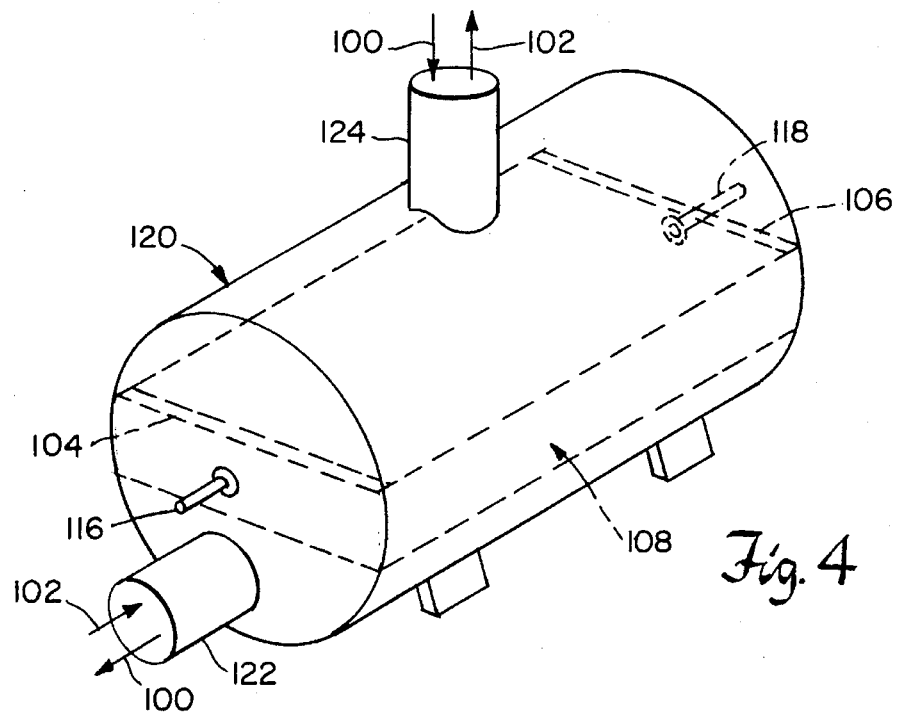
FIG. 4 is a three-dimensional view of another alternative construction of a sorbent bed according to this invention.
Figure 5:
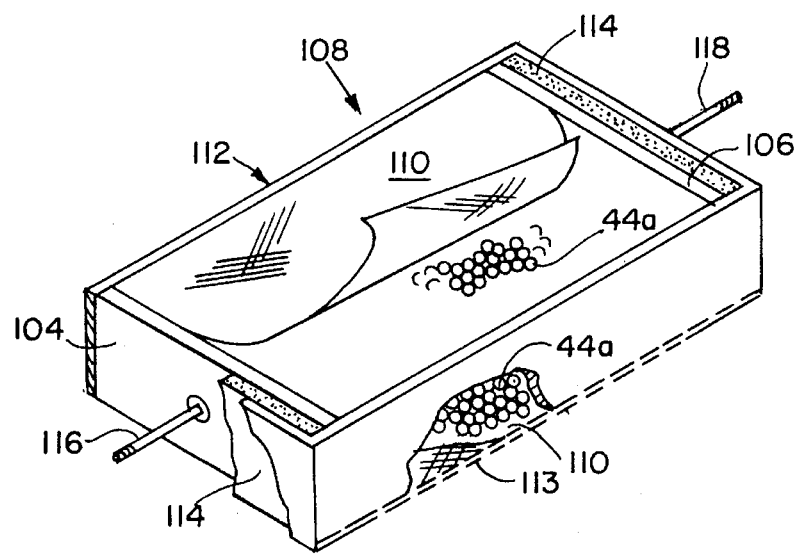
FIG. 5 is a more detailed view of the carbon bed of FIG. 4.
Figure 6:
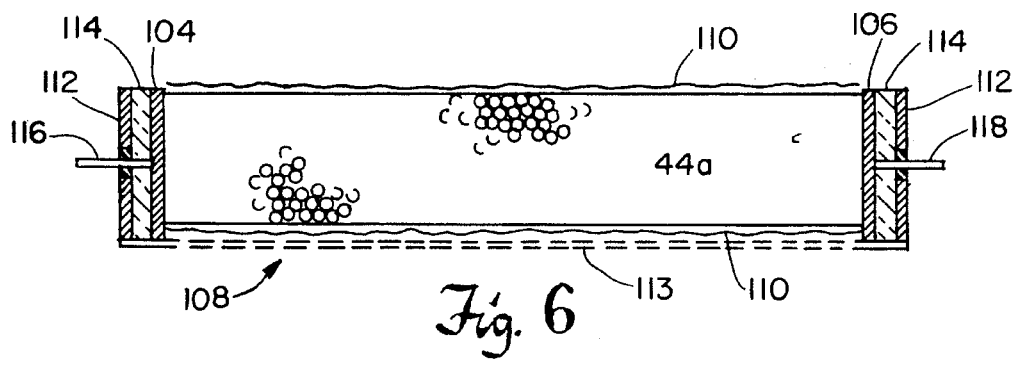
FIG. 6 is a side, elevational, cross sectional view of the carbon bed of FIG. 5.

In an alternative embodiment, FIG. 4, the gas flows normal, arrows 100, 102, to the plane of the electrodes 104, 106 so that the electrodes do not have to be perforated to distribute the flow. The carbon pellet bed 108, FIGS. 5 and 6, is enclosed in woven fiber glass cloth 110 (as electrical insulation) which in turn is enclosed in a metal case 112 with a bottom metal mesh support 113. Stainless steel electrodes 104, 106 are insulated from metal case 112 by a Teflon coating 114. Power wires 116, 118 are attached to the stainless steel electrodes 104, 106. The entire carbon pellet bed 108 is enclosed in steel drum bed holder 120, FIG. 4. Inlet and outlet ducts 122, 124 are provided for in the steel drum 120 and allow either the contaminated gas or inert regeneration gas to flow into and out of the system; the carbon pellets 44a distribute the flow across the cross-section of the carbon bed.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An electrically conductive sorption system for separating species of different adsorption characteristics in a fluid, comprising:
   a containment vessel;
   an electrically conductive permeable sorbent bed in said vessel having a multiplicity of adsorption sites;
   a porting structure for supplying contaminated fluid at one surface of said bed and for receiving the decontaminated fluid at another surface of said bed;
   a pair of spaced electrodes and a means for applying current through said bed during the adsorption to heat said bed to inhibit adsorption by the bed of the more strongly adsorbed species that would occupy adsorption sites in said bed thereby increasing the adsorption sites available for adsorption by the bed of the less strongly adsorbed specie.

2. The adsorption system of claim 1 in which said sorbent bed is granular.

3. The adsorption system of claim 1 in which said sorbent bed is pelletized.

4. The adsorption system of claim 1 in which said sorbent bed is carbon.

5. The adsorption system of claim 1 further including a thermally insulating liner between the containment vessel and the sorbed bed.

6. The adsorption system of claim 5 in which said liner is tetrafluorethylene.

7. The adsorption system of claim 1 in which said porting structure includes one or more perforations in said electrodes.

8. The adsorption system of claim 1 in which said surfaces are the opposite ends of said bed.

9. The adsorption system of claim 1 in which said less strongly adsorbed specie is water.

10. The adsorption system of claim 9 in which said bed is heated to approximately 20° C. above fluid inlet temperature.

11. The adsorption system of claim 1 further including a controller for intermittently applying current to said electrodes to periodically raise the temperature of said bed to drive off said more strongly adsorbed specie and release more adsorption sites for adsorption of said less strongly adsorbed species.

12. The adsorption system of claim 1 in which said containment vessel is electrically conducting and there is an electrically insulating medium for electrically isolating said bed from said vessel.

13. An in situ electrically conductive sorption and regeneration system for removing one or more adsorbed species in a fluid from a sorbent bed by collecting one or more contaminant species from a fluid in a sorbent bed, and subsequently removing said contaminants from said bed, comprising:
   a containment vessel;
   an electrically conductive permeable sorbent bed in said vessel having a multiplicity of adsorption sites;
   an electrically insulating medium for electrically isolating said bed from said vessel;
   a porting structure for supplying contaminated fluid at one surface of said bed, and for receiving the contaminated fluid at another surface of said bed;

a porting structure for removing one or more adsorbed species;

a pair of spaced electrodes contacting said bed for applying current through said bed to heat said bed to at least one elevated temperature to desorb said at least one adsorbed species and regenerate said bed; and a controller for intermittently applying current to said electrodes to periodically raise the temperature of said bed to drive off a more strongly adsorbed specie and release more adsorption sites for adsorption of a less strongly adsorbed species.

14. The in situ electrically conductive sorption and regeneration system of claim 13 which said porting structure for removing one or more adsorbed species includes an outlet for applying a vacuum thereto.

15. An in situ electrically conductive sorption system for separating species of different adsorption characteristics wherein one of said species is water in a fluid, comprising:

a containment vessel;

an electrically conductive permeable sorbent bed in said vessel having a multiplicity of adsorption sites;

an electrically insulating medium for electrically isolating said bed from said vessel;

a porting structure for supplying contaminated fluid at one surface of said bed and for receiving the decontaminated fluid at another surface of said bed;

a pair of spaced electrodes for applying current through said bed during the adsorption; and a controller for intermittently applying current to said electrodes to periodically heat said bed to inhibit adsorption by the bed of the water, which otherwise would occupy adsorption sites in said bed thereby increasing the adsorption sites available for adsorption by the bed of a more weakly adsorbed specie.

16. An in situ electrically conductive sorption system for separating water from at least one other specie of different adsorption characteristics, comprising:

a containment vessel;

an electrically conductive permeable sorbent carbon bed in said vessel having a multiplicity of adsorption sites;

an electrically insulating medium for electrically isolating said bed from said vessel;

a porting structure for supplying contaminated fluid at one surface of said carbon bed and for receiving the decontaminated fluid at another surface of said carbon bed;

a pair of spaced electrodes for applying current through said carbon bed during adsorption to heat said carbon bed to inhibit adsorption by the carbon bed of the water which would occupy adsorption sites in said carbon bed thereby increasing the adsorption sites available for adsorption by the carbon bed of the more strongly adsorbed specie; and a controller for intermittently applying current to said electrodes to periodically heat said bed to inhibit adsorption by the bed of the water, which otherwise would occupy adsorption sites in said bed thereby increasing the adsorption sites available for adsorption by the bed of the more weakly adsorbed specie.

17. An in situ electrically conductive sorption and regeneration system for removing one or more adsorbed species wherein one of said species is water in a fluid from a sorbent bed by collecting one or more contaminant species from a fluid in a sorbent bed, and subsequently removing said contaminants from said bed, comprising:

a containment vessel;

an electrically conductive permeable sorbent carbon bed in said vessel having a multiplicity of adsorption sites;

an electrically insulating medium for electrically isolating said bed from said vessel;

a porting structure for removing water and one or more adsorbed species;

a pair of spaced electrodes contacting said bed for applying current through said bed to heat said bed to at least one elevated temperature to desorb water adsorbed by the carbon bed; and a controller for intermittently applying current to said electrodes to periodically heat said bed to inhibit adsorption by the bed of the water, which otherwise would occupy adsorption sites in said bed thereby increasing the adsorption sites available for adsorption by the bed of the more weakly adsorbed specie.

18. A method of separating species of different adsorptive characteristics, comprising:

flowing a contaminated fluid through an electrically conductive sorbent bed having a multiplicity of adsorption sites; and providing an electrical current through said sorbent bed to heat said bed to inhibit adsorption by the bed of the more strongly adsorbed specie which occupies adsorption sites in said bed to increase the adsorption sites available for adsorption by the bed of the less strongly adsorptive species.

19. The method of separating species of different adsorptive characteristics of claim 18 in which said electrical current is supplied intermittently to maintain the heat of the bed and minimize transfer of heat to the contaminated fluid flow.

20. The method of separating species of different adsorptive characteristics of claim 19 in which said electrical current is supplied at an increased magnitude to heat the bed to an elevated temperature for regeneration in situ.

* * * * *